July 7, 1925.

M. J. BATEMAN 1,544,627

NUT LOCK

Filed June 30, 1924

Inventor
M. J. Bateman
By Marks a Clerk
Attys.

Patented July 7, 1925.

1,544,627

UNITED STATES PATENT OFFICE.

MAURICE JOHN BATEMAN, OF STANMORE, NEAR SYDNEY, NEW SOUTH WALES, AUSTRALIA.

NUT LOCK.

Application filed June 30, 1924. Serial No. 723,405.

*To all whom it may concern:*

Be it known that I, MAURICE JOHN BATEMAN, a subject of the King of Great Britain and Ireland, residing at 150 Albany Road, Stanmore, near Sydney, New South Wales, Commonwealth of Australia, have invented new and useful Improvements in Nut Locks, of which the following is a specification.

This invention relates to nut locks and has for its object to provide a simple, cheap and effective lock for nuts after the latter have been screwed home on the bolts which carry them. The nut lock has been designed principally for use in locking the nuts of railway fish plates though it is utilizable as a lock for nuts in other locations.

Figure 1:
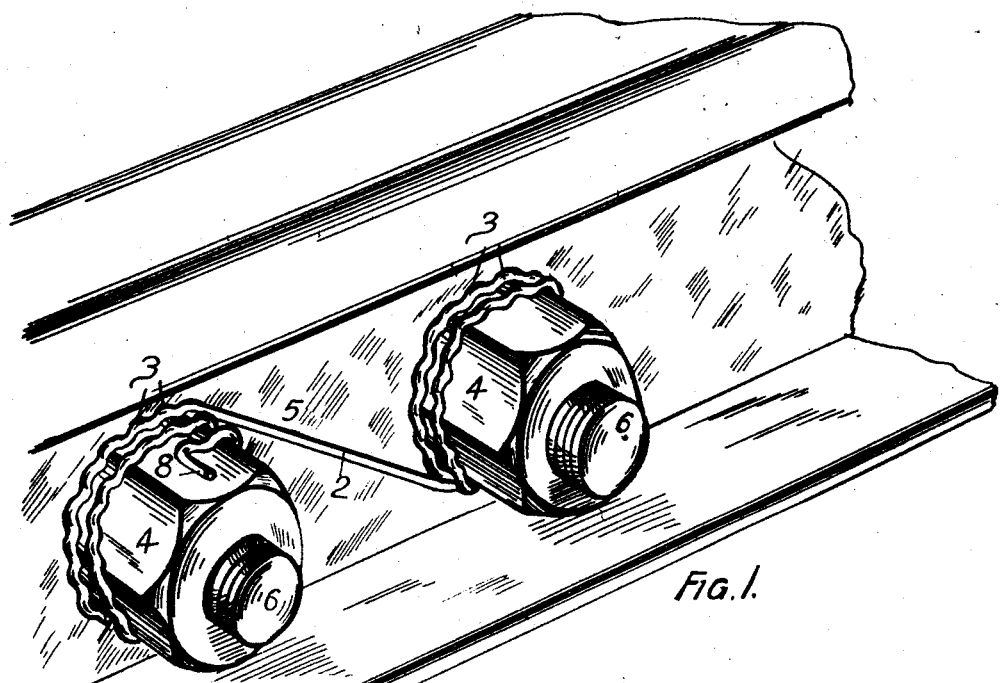
Figure 2:
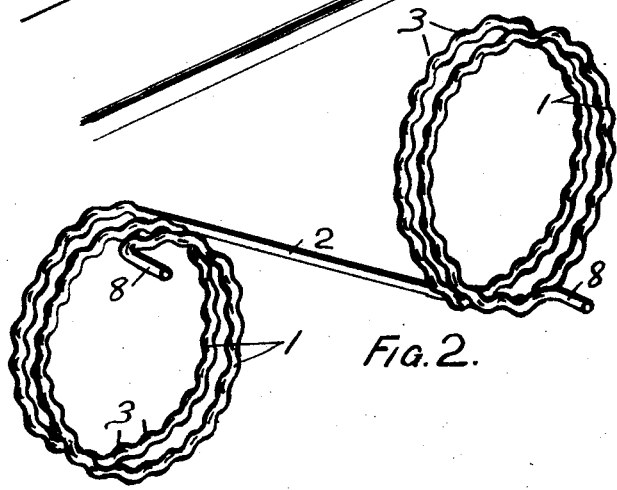
Figure 3:
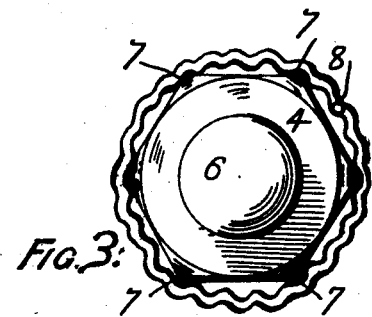

Referring to the accompanying drawings in which the invention is illustrated, Fig. 1 is a perspective view of the nut lock attached to two nuts associated with a railway fish plate; Fig. 2 a perspective view of the nut lock; and Fig. 3 a detail view illustrating the front of a nut with a portion of the lock thereon, the depressions of the lock being shown fitting the angular corners of the nut to prevent the latter from turning.

In constructing the lock a piece of resilient galvanized wire of 12 B. W. G. or other suitable gauge is provided, which wire is crimped or crinkled at portions thereof. Such crimping 1 is preferably at both ends of the wire and carried from opposite ends thereof to points towards the medial line of the wire, but preferably leaving a portion 2 of the wire as a plane surface.

Both of the ends of the crimped wire are bent to form two or more coils 3, each of the said coils being disposed on opposite sides of the medial approximately straight shank 2 of the wire. These helically arranged coils are positioned in the same plane laterally of the medial portion or shank 2 so that the latter may be arranged against the piece of material positioned between the nut and bolt arrangements which are to be locked.

To lock a pair of nuts 4 which are distanced apart from each other, any two of the nuts of a railway fish plate 5, it is only necessary after the nuts 4 have been screwed home on their carrying bolts 6 to place the separate crimped coils 3 of the lock about the separate nuts 4, so that the angular edges 7 of the nuts will lie within the depressions of the crimps or crinkles 1 of the lock and the nuts 4 will thus be prevented from turning on their carrying bolts 6. In certain cases the opposite ends of the locking wire may be turned at an angle to form finger grips 8 when the coils 3 are being set around a pair of nuts.

As the crimped coils 3 of the lock may be formed to any suitable diameter the lock may be attached to nuts 4 of varying diameter by forming the coils 3 to the required diameter of nut to be locked. Similarly, the lock may be secured to a pair of nuts notwithstanding the distance of the axes of such nuts as the lock may be formed with the coils 3 set apart to any required distance. No special tool is required for setting the lock on nuts, or for removing same should it be required to tighten such nuts on their carrying bolts. Further, the lock has a special advantage in holding nuts in locked position on bolts inasmuch as its ends may be formed with two or more coils adapted to lie side by side around the nuts and thus offering a multiplied gripping surface to the angled corners of the nuts.

What I claim as my invention and desire to secure by Letters Patent is:—

The combination with a pair of bolts and nuts mounted thereon, of a lock for preventing movement of the nuts on the bolts and formed from a single piece of resilient wire of suitable gauge and comprising a straight medial portion arranged at an inclination between the nuts on the bolts, a plurality of helically arranged crimped coils continuing from the medial portion and arranged in the same plane laterally of the medial portion but extending in opposite directions with respect to the longitudinal axis of the medial portion and engaged with the nuts on the bolts so that the depressions of the separate coils fit around the angled corners of the nuts so as to prevent rotation thereof, and laterally projecting finger grips continuing from the coils and constituting the terminals of the single piece of wire to facilitate application and removal of the nut lock.

In testimony whereof I have signed my name to this specification.

MAURICE JOHN BATEMAN.